Nov. 22, 1960
G. G. MENKEL
2,961,137
FEED MECHANISM
Filed April 22, 1958
2 Sheets-Sheet 1
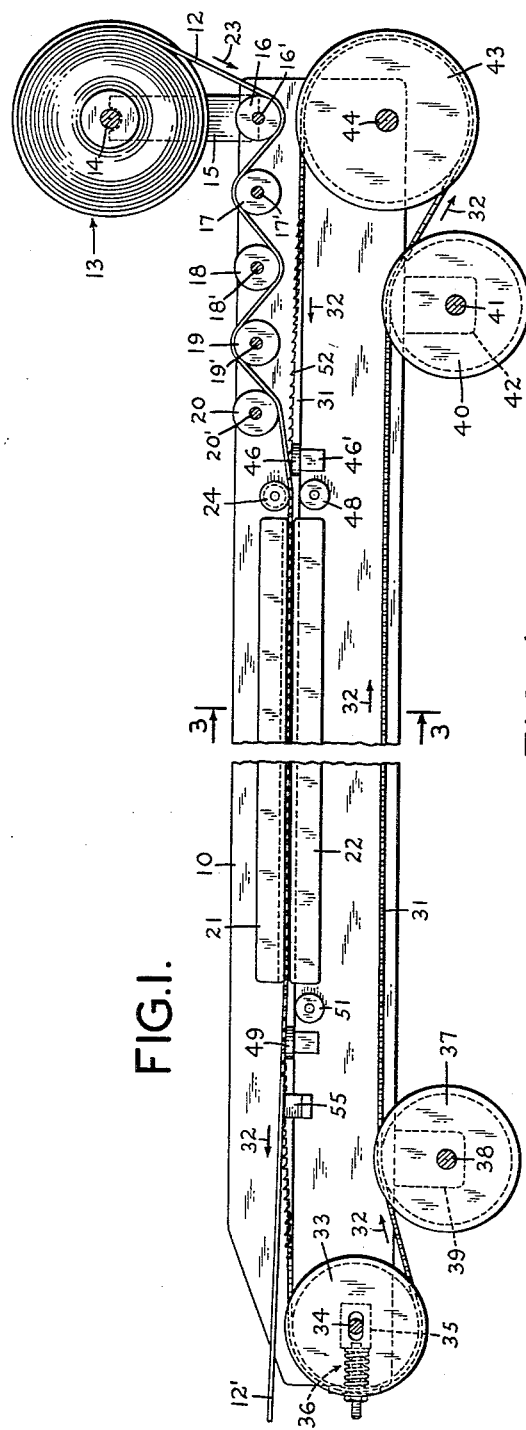
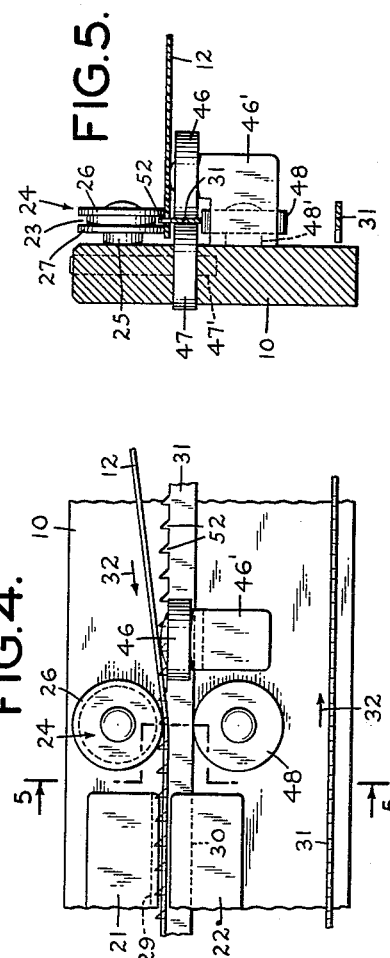
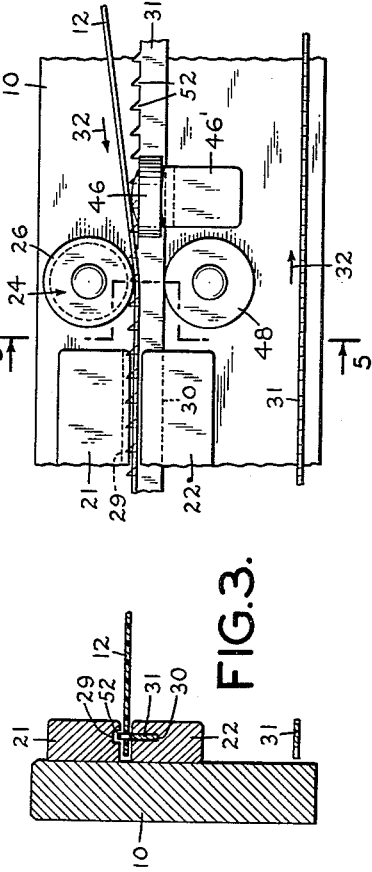

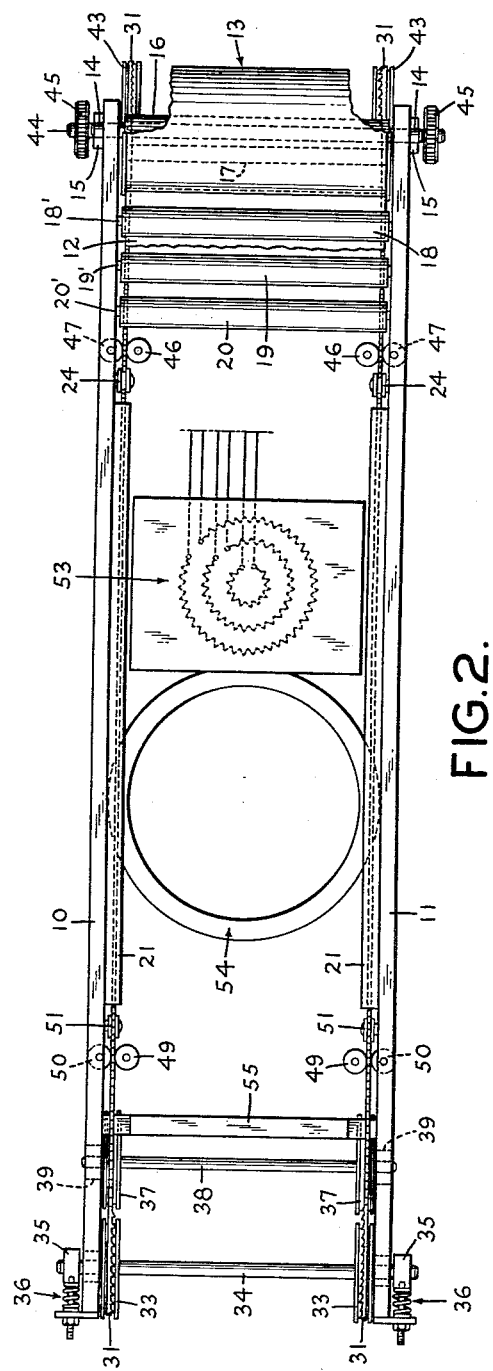

United States Patent Office 2,961,137
Patented Nov. 22, 1960

2,961,137

FEED MECHANISM

Gary G. Menkel, Jamaica, N.Y., assignor to Design Center, Inc., Long Island City, N.Y., a corporation of New York Filed Apr. 22, 1958, Ser. No. 730,135

10 Claims. (Cl. 226—53)

The present invention relates to machines for forming or shaping sheet material, and more particularly to a feed mechanism for use in such machines.

In Middleton Patent 2,522,956, issued September 19, 1950, there is described an efficient and highly successful machine for rapidly forming shaped articles from thermoplastic sheet material. In this machine, the edges of a web of thermoplastic material are gripped and the web is advanced through a heating zone and a drawing zone, excess material from the web being discharged from the machine after the article to be made has been drawn. The present invention is concerned with an improvement in machines of this general type and in particular with a novel and improved feeding mechanism for the web of thermoplastic material.

In the feeding of sheet materials for drawing, it is desirable that the sheet material not be allowed to come loose from the feeding device. This presents a problem in some instances, especially in the case of certain thermoplastic materials such as polarized extruded styrene sheet materials which have a strong tendency to shrink when heated. One example of such a material is sold by Plax Corporation under the trademark Polyflex. It is also desirable that the width of the marginal edges of the sheet material used for gripping the web be as small as possible thereby to afford maximum use of the width of the web for the article to be drawn.

It is also desirable that the feed mechanism for sheet material be relatively simple in construction and smooth in operation and that it afford accurate longitudinal registration of the sheet material.

In accordance with the foregoing, it has been a principal object of the invention to provide a novel and improved feed mechanism for a machine for forming shaped articles from sheet materials.

Another object of the invention has been to provide a feed mechanism of the foregoing type for use with heated thermoplastic material and which is constructed so as to prevent release of said material due to transverse shrinkage stresses therein.

Still another object of the invention has been the provision of a feed mechanism of the foregoing type in which the width of the marginal edges of the web contacted by the feed mechanism is minimized.

A further object of the invention has been the provision of a feed mechanism of the foregoing type in which the construction of the feed mechanism is relatively simple and conducive to smooth operation.

Another object of the invention has been the provision of a feed mechanism of the foregoing type in which the feed mechanism affords accurate longitudinal registration of the advancing web.

Other and further objects, features and advantages of the invention will appear more fully from the following description.

The invention will now be described in greater detail with reference to the appended drawings, in which:

Fig. 1 is a side elevational view of one form of feed mechanism constructed in accordance with the invention with one side of the mechanism removed for clarity;

Fig. 2 is a plan view of the feed mechanism of Fig. 1;

Fig. 3 is an enlarged sectional view taken along the line 3—3 of Fig. 1;

Fig. 4 is an enlarged view of a portion of Fig. 1; and

Fig. 5 is a sectional view taken along line 5—5 of Fig. 4.

Referring now to the drawings, there are provided two spaced parallel frame members 10 and 11 positioned adjacent opposite sides of a web 12 of thermoplastic material. The spacing between the frame members 10 and 11 is preferably adjustable in order to accommodate different web widths. The frame member 11 has been omitted in Fig. 1 to facilitate viewing of the inside surface of the frame member 10 and elements carried thereon. Since the feed mechanism elements carried on the inside surface of the frame member 10 are identical with similar elements provided on the inside surface of the frame member 11, the structure may be considered as two feed mechanisms, one for each side of the web 12. Since the mechanisms are identical, only one will be described in detail, this being the one illustrated in Fig. 1.

The web 12, which may be considered as continuous, is supplied from a reel 13 carried on a shaft 14 journaled for rotation in bearing surfaces provided in standards 15 mounted on the frame members 10 and 11. A series of spaced parallel guide rollers 16, 17, 18, 19 and 20 are mounted on shafts 12', 17', 18', 19' and 20', respectively, the latter being journaled for rotation in suitable holes provided in the frame members 10 and 11.

On its inside surface the frame member 10 carries a pair of elongated spaced parallel guide bars 21 and 22 extending throughout a central portion of the frame member 10. The bar 21 may be termed a hold down guide bar, while the bar 22 may be termed a conveyor guide bar. The web 12 passes in the direction shown by the arrow 23 from reel 13 under roller 16, over roller 17, under roller 18, over roller 19 and under roller 20. From roller 20 the web 12 passes under a hold down roller 24 and thence between the guide bars 21 and 22. The web is discharged at the left end of the mechanism (Fig. 1), as shown at 12'. The roller 24 mounted for rotation on a stub shaft 25 extending from the inner surface of the frame member 10. The roller 24 has a pair of spaced outwardly extending radial flanges 26 and 27 between which there is provided an annular space 28. The flanges 26 and 27 are arranged to be in contact with a marginal portion of the web 12.

As is best shown in Fig. 3, the hold down guide bar 21 is generally rectangular in cross section and is provided with a longitudinally extending slot 29 in the bottom surface thereof. The conveyor guide bar 22 is likewise generally rectangular in cross section and is provided with a narrow longitudinally extending slot 30 in its upper surface, the slot 30 being disposed opposite the center of the slot 29.

A thin metal band or strip 31 is disposed partially within the slot 30 and is arranged for axial sliding movement in the slot. The walls of the slot 30 guide the strip 31 in its axial travel and prevent lateral motion of the strip 31. The strip 31 is in the form of an endless belt and travels in the direction indicated by the arrows 32. After the strip 31 leaves the guide bars 21 and 22 it passes around a tension wheel 33 mounted for rotation on a shaft 34. The shaft 34 is journaled in slots provided in the frame members 10 and 11. The shaft 34 is contacted by a bushing 35 which is urged to the left in Fig. 1 by a spring mechanism 36 in order to maintain a desired tension on the strip 31.

After passing around the tension wheel 33 the strip 31 passes over an idler wheel 37 mounted for rotation on a shaft 38 carried on a depending lug 39 on the frame 10. After passing over the idler wheel 37, the strip 31 passes along the lower portion of the frame 10 beneath the conveyor guide bar 22. Near the opposite end of the frame member 10 the strip 31 passes over an idler wheel 40 mounted for rotation on a shaft 41 carried on a depending lug 42 on the frame member 10.

After passing over the idler wheel 40, the strip 31 passes around a drive wheel 43 mounted for rotation with a drive shaft 44 journaled in suitable holes provided in the frame members 10 and 11. As shown in Fig. 2, the shaft 44 is provided with gears 45 which may be suitably connected to a source of power for rotating the shaft 44 and the drive wheel 43, thus causing the strip 31 to travel in the direction shown by the arrows 32. The shaft 44 may be powered in any suitable manner, such as, for example, the means shown for powering the feed mechanism in the aforementioned Middleton patent.

After leaving the drive wheel 43, the strip 31 passes between a pair of guide rollers 46 and 47 and over a guide roller 48. The rollers 46, 47 and 48 preferably are of the type with ball or roller bearings on their outer surfaces for guiding the sides and bottom of the strip 31. The rollers 46, 47 and 48 are located adjacent the front end of the guide bars 21 and 22. The roller 46 is supported on a bracket 46', the roller 47 is mounted in a slot provided in the frame member 10 and is supported on a shaft 47' carried in a hole in the frame member 10, and the roller 48 is supported on a bracket 48'. A similar set of rollers 49, 50 and 51 is provided adjacent the rear end of the guide bars 21 and 22.

The rollers 46, 47 and 48 and 49, 50 and 51 support the strip 31 in a vertical position as it passes between the guide bars 21 and 22. As shown in Fig. 1, the strip after leaving the rollers 49, 50 and 51 gradually assumes a horizontal position, which it maintains until a short distance before contacting the rollers 46, 47 and 48.

One edge of the strip 31, as best shown in Fig. 4, is formed with spaced triangular serrations 52. The serrations 52 may be described as sharp teeth, the sharp point of each tooth being the point most remote from the body of the strip 31. The strip 31, as it passes between the guide bars 21 and 22, is supported with the teeth 52 disposed partially within the slot 29, as shown in Figs. 3 and 4. As the strip 31 passes below the hold down roller 24, the teeth extend partially into the annular space 28.

As the web 12 passes from under the roller 20 to under the roller 24, it is engaged adjacent its marginal edge by the teeth 52. The teeth 52, being sharp, cleanly perforate the web 12 so that the web is firmly held by the teeth 52 as the web 12 passes between the guide bars 21 and 22. The teeth 52, corresponding sets of which are provided adjacent both edges of the web 12, advance the web in an axial direction and positively grip and support the web as it passes between the guide bars. The teeth 52 extending into the perforations prevent slippage or shrinkage of the plastic material in either a transverse or axial direction. Thus when the web 12 is heated, the tendency to shrink is counteracted, as is also any tendency to lose axial registration. Contact of the flanges 26 and 27 with the web surface on either side of the teeth 52, as shown in Fig. 5, ensures that the teeth 52 provide the desired perforations in the web 52. As the web passes between the guide bars 21 and 22, the web is prevented from becoming disengaged from the teeth 52 by contact with the bottom surface of the hold down guide bar 21 on opposite sides of the slot 29.

As the web is advanced through the region in which it is supported between the guide bars 21 and 22, it may pass first a heating station, generally designated 53, and then a forming station, generally designated 54, where the die contacts the web to form the desired article. The remnant of the web, which represents waste material, is disenaged from the teeth 52 as the web passes a laterally disposed ramp or bar 55. The advance of the web through the heating and forming zones in an intermittent manner may be controlled in any convenient way, such, for example, as is described in the aforementioned Middleton patent.

As illustrated in the drawings, the teeth 52 which perforate and grip the web 12 are integral with the strip 31. It should be understood, however, that these teeth may be separate elements mounted on the edge of the strip 31. Moreover, the teeth need not be provided on the edge of the strip 31, although this is preferred. Thus the teeth may project through or be mounted on a flat surface of the strip. In this case the strip would be maintained in a horizontal position with respect to the web. The teeth could be mounted on the side of the strip but be arranged to project above the edge thereof so as to contact and perforate the web. The teeth need not be triangular, as shown, but may be in any convenient shape, e.g., sharp pins, so long as they are sharp enough to perforate cleanly the web.

While the invention has been described in connection with a specific embodiment thereof and in a specific use, various modifications thereof will occur to those skilled in the art without departing from the spirit and scope of the invention as set forth in the appended claims.

What is claimed is:

1. In a machine for forming thermoplastic sheet material, a feeding mechanism for advancing a web of said material in a predetermined path through said machine whereby desired operations may be performed thereon, comprising a source of a web of said sheet material, a pair of spaced endless strips each having a serrated edge with closely spaced, generally triangularly shaped sharp teeth, means to guide said web into contact with said strips whereby said teeth of each strip perforate said web adjacent a respective marginal edge thereof, said last mentioned means including a member arranged to contact said web to force the latter into pressure contact with said teeth, rigid guide means extending longitudinally of said predetermined path and being arranged to support said strips for sliding motion along said predetermined path whereby said strips together with said perforated web pass along said predetermined path, said rigid guide means having extended surfaces extending longitudinally of said predetermined path and arranged to be in substantial surface contact with opposing respective surfaces of said strips over at least a major portion of said predetermined path thereby to prevent lateral motion of said strips toward each other as said strips advance along said predetermined path, means to prevent disengagement of said web from said teeth while said strips are passing along said predetermined path, and drive means arranged to advance said strips along said predetermined path.

2. In a machine for forming thermoplastic sheet material, a feeding mechanism for advancing a web of said material in a predetermined path through said machine whereby desired operations may be performed thereon, comprising a source of a web of said sheet material, a pair of spaced parallel endless strips each having a serrated edge with sharp teeth, means to guide said web into contact with said strips and to force said web on to said teeth whereby said teeth of each strip perforate said web adjacent a respective marginal edge thereof, said last mentioned means including a roller arranged to contact said web to force the latter into pressure contact with said teeth, rigid guide means extending longitudinally of said predetermined path and having a first pair of surfaces arranged to support said respective strips for sliding motion along said predetermined path whereby said strips together with said perforated web pass along said predetermined path, said rigid guide means having a second pair of surfaces extending longitudinally of said predetermined path and each arranged to be in substantial surface contact with an opposing respective surface of a respective one of said strips over at least a major portion of said predetermined path thereby to prevent lateral motion of said strips toward each other as said strips advance along said predetermined path, means to prevent disengagement of said web from said teeth while said strips are passing along said predetermined path, and drive means arranged to advance said strips in said predetermined path.

3. In a machine for forming thermoplastic sheet material, a feeding mechanism for advancing a web of said material in a predetermined path through said machine whereby desired operations may be performed thereon, comprising a source of a web of said sheet material, a pair of spaced parallel endless strips each having a serrated edge with sharp teeth, means to guide said web into contact with said strips and to force said web on to said teeth whereby said teeth of each strip perforate said web adjacent a respective marginal edge thereof, said last mentioned means including a pair of rollers arranged to contact said web, a pair of guide members each having a narrow slot extending longitudinally along said predetermined path over at least a major portion of said predetermined path, said strips each being supported for sliding motion in a respective one of said slots, the walls of said slots confining said respective strips against lateral motion whereby said strips together with said perforated web pass along said predetermined path, means to prevent disengagement of said web from said teeth while said strips are passing along said predetermined path, means to support and guide said strips during portions of their travel not included in said predetermined path, said last mentioned means including tensioning means for maintaining said strips under predetermined tension, and drive means arranged to advance said strips along said predetermined path.

4. In a machine for forming sheet material, a feeding mechanism for advancing a web of said material along a predetermined path through said machine whereby desired operations may be performed thereon, comprising a pair of spaced parallel frame members disposed along said predetermined path, a lower longitudinally extending guide bar carried on the facing surfaces of each of said frame members, said lower guide bars each having a narrow longitudinally extending slot in an upper surface thereof, an upper longitudinally extending guide bar carried on said facing surfaces of each of said frame members, said upper guide bars each having a longitudinally extending slot in a lower surface thereof, a pair of flat endless strips each having a serrated edge with sharp teeth projecting from the flat surface of the strip, each of said strips being supported for sliding motion in said slot in a respective one of said lower guide bars, said teeth extending partially into said slots in the corresponding upper guide bars, a source of a web of said sheet material, means to direct said web into contact with said strips whereby said teeth perforate and grip said web adjacent marginal edges thereof and whereby said web is advanced along said path as said strips are moved along through said slots in said lower guide bars, said last mentioned means including a pair of rollers each arranged to contact said web adjacent a respective marginal edge thereof and to force said web into pressure contact with said teeth, a series of supporting wheels arranged for guiding and supporting said strips, means including one of said supporting wheels for driving each of said strips thereby to advance said strips and said web along said predetermined path, and roller means contacting the sides of said strips to guide said strips into said slots in said lower guide bars.

5. A feeding mechanism for advancing a web of sheet material along a predetermined path whereby desired operations may be performed thereon, comprising a pair of spaced parallel frame members disposed along said predetermined path, a lower longitudinally extending guide bar carried on the facing surfaces of each of said frame members, said lower guide bars each having a narrow longitudinally extending slot in an upper surface thereof, an upper longitudinally extending guide bar carried on said facing surfaces of each of said frame members, said upper guide bars each having a longitudinally extending slot, a pair of endless strips each having a serrated edge with sharp teeth, each of said strips being supported for sliding motion in said slot in a respective one of said lower guide bars, said teeth extending partially into said slots in the corresponding upper guide bars, a source of a web of said sheet material, means to direct said web into contact with said strips whereby said teeth perforate and grip said web adjacent marginal edges thereof and whereby said web is advanced along said path as said strips are moved along through said slots in said lower guide bars, said last mentioned means including a pair of members each arranged to contact said web adjacent a respective marginal edge thereof to force the latter into pressure contact with said teeth, a series of supporting wheels arranged for guiding and supporting said strips, means including one of said supporting wheels for driving each of said strips thereby to advance said strips and said web along said predetermined path, and roller means contacting the sides of said strips to guide said strips into said slots in said lower guide bars.

6. In a machine for forming thermoplastic sheet material, a feeding mechanism for advancing a web of said material along a predetermined path through said machine whereby desired operations may be performed thereon, comprising a pair of spaced parallel frame members disposed along said predetermined path, a lower longitudinally extending guide bar carried on the facing surfaces of each of said frame members, said lower guide bars each having a narrow longitudinally extending slot in an upper surface thereof, an upper longitudinally extending guide bar carried on said facing surfaces of each of said frame members, said upper guide bars each having a longitudinally extending slot in a lower surface thereof, a pair of endless strips each having a serrated edge with sharp teeth, each of said strips being supported for sliding motion in said slot in a respective one of said lower guide bars, said teeth extending partially into said slots in the corresponding upper guide bars, a source of a web of said sheet material, means to direct said web into contact with said strips whereby said teeth perforate and grip said web adjacent marginal edges thereof and whereby said web is advanced along said path as said strips are moved along through said slots in said lower guide bars, said directing means including a pair of rollers each contacting said web adjacent a respective marginal edge thereof, said rollers each having an annular slot therein for accommodating the teeth of a respective one of said strips, a series of supporting wheels arranged for guiding and supporting said strips, and means including one of said supporting wheels for driving said strips thereby to advance said strips and said web along said predetermined path.

7. In a machine for forming thermoplastic sheet material, a feeding mechanism for advancing a web of said material along a predetermined path through said machine whereby desired operations may be performed thereon, comprising a pair of spaced parallel frame members disposed along said predetermined path, a lower longitudinally extending guide bar carried on the facing surfaces of each of said frame members, said lower guide bars each having a narrow longitudinally extending slot in an upper surface thereof, an upper longitudinally extending guide bar carried on said facing surfaces of each of said frame members, said upper guide bars each having a longitudinally extending slot in a lower surface thereof, a pair of endless strips each having a serrated edge with sharp teeth, each of said strips being supported for sliding motion in said slot in a respective one of said lower guide bars, said teeth extending partially into said slots in the corresponding upper guide bars, a source of a web of said sheet material, means to direct said web into contact with said strips whereby said teeth perforate and grip said web adjacent marginal edges thereof and whereby said web is advanced along said path as said strips are moved along through said slots in said lower guide bars, said directing means including a pair of first rollers each contacting said web adjacent a respective marginal edge thereof, said first rollers each having an annular slot therein for accommodating the teeth of a respective one of said strips, second roller means arranged to contact said strips adjacent said first rollers and to maintain said strips in upright position as the latter enter said slots in said lower guide bars, third roller means arranged to contact said strips as the latter leave said lower guide bars, a series of supporting wheels arranged for guiding and supporting said strips, and means including one of said supporting wheels for driving each of said strips thereby to advance said strips and said web along said predetermined path.

8. In a machine for forming thermoplastic sheet material, a feeding mechanism for advancing a web of said material along a predetermined path through said machine whereby desired operations may be performed thereon, comprising a pair of spaced parallel frame members disposed along said predetermined path, a lower longitudinally extending guide bar carried on the facing surfaces of each of said frame members, said lower guide bars each having a narrow longitudinally extending slot in an upper surface thereof, an upper longitudinally extending guide bar carried on said facing surfaces of each of said frame members, said upper guide bars each having a longitudinally extending slot in a lower surface thereof, a pair of endless strips each having a serrated edge with sharp teeth, each of said strips being supported for sliding motion in said slot in a respective one of said lower guide bars, said teeth extending partially into said slots in the corresponding upper guide bars, a source of a web of said sheet material, means to direct said web into contact with said strips whereby said teeth perforate and grip said web adjacent marginal edges thereof and whereby said web is advanced along said path as said strips are moved along through said slots in said lower guide bars, said directing means including a pair of first rollers each contacting said web adjacent a respective marginal edge thereof, said first rollers each having an annular slot therein for accommodating the teeth of a respective one of said strips, second roller means arranged to contact said strips adjacent said first rollers and to maintain said strips in upright position as the latter enter said slots in said lower guide bars, third roller means arranged to contact said strips as the latter leave said lower guide bars, a series of supporting wheels arranged for guiding and supporting said strips, means including one of said supporting wheels for driving each of said strips thereby to advance said strips and said web along said predetermined path, and means including one of said supporting wheels for maintaining said strips under predetermined tension.

9. A feeding mechanism for advancing a web of sheet material along a predetermined path whereby desired operations may be performed thereon, comprising a pair of spaced parallel frame members disposed along said predetermined path, a lower longitudinally extending guide bar carried on the facing surfaces of each of said frame members, said lower guide bars each having a narrow longitudinally extending slot in an upper surface thereof, an upper longitudinally extending guide bar carried on said facing surfaces of each of said frame members, said upper guide bars each having a longitudinally extending slot, a pair of endless strips, each of said strips having a set of sharp teeth arranged to project from one surface thereof, each of said strips being supported for sliding motion in said slot in a respective one of said lower guide bars, said teeth extending partially into said slots in the corresponding upper guide bars, a source of a web of said sheet material, means to direct said web into contact with said teeth whereby said teeth perforate and grip said web adjacent marginal edges thereof and whereby said web is advanced along said path as said strips are moved along through said slots in said lower guide bars, said last mentioned means including a pair of rollers each arranged to contact said web adjacent a respective marginal edge thereof and to force said web into pressure contact with said teeth, a series of supporting wheels arranged for guiding and supporting said strips, means including one of said supporting wheels for driving each of said strips thereby to advance said strips and said web along said predetermined path and roller means contacting the sides of said strips to guide said strips into said slots in said lower guide bars.

10. In a machine for forming thermoplastic sheet material, a feeding mechanism for advancing a web of said material in a predetermined path through said machine whereby desired operations may be performed thereon, comprising a source of a web of said sheet material, a plurality of spaced endless strips each having a serrated edge with closely spaced, generally triangularly shaped sharp teeth, means to guide said web into contact with said strips whereby said teeth of each strip perforate said web, one of said strips being arranged to perforate said web adjacent one marginal edge thereof and another of said strips being arranged to perforate said web adjacent the other marginal edge thereof, said last mentioned means including a member arranged to contact said web to force the latter into pressure contact with said teeth, rigid guide means extending longitudinally of said predetermined path and being arranged to support said strips for sliding motion along said predetermined path whereby said strips together with said perforated web pass along said predetermined path, said rigid guide means having extended surfaces extending longitudinally of said predetermined path and arranged to be in substantial surface contact with opposing respective surfaces of said one strip and said other strip over at least a major portion of said predetermined path thereby to prevent lateral motion of said one strip and said other strip toward each other as said one strip and said other strip advance along said predetermined path, means to prevent disengagement of said web from said teeth of said one strip and said other strip while said one strip and said other strip are passing along said predetermined path, and drive means arranged to advance said strips along said predetermined path.

References Cited in the file of this patent

UNITED STATES PATENTS

| | | |
|---|---|---|
| 1,247,891 | Stern | Nov. 27, 1917 |
| 1,763,735 | Wydom | June 17, 1930 |
| 2,080,524 | Allen | May 18, 1937 |
| 2,619,175 | Gottlieb | Nov. 25, 1952 |
| 2,724,254 | Zanger | Nov. 22, 1955 |